Figure 1:
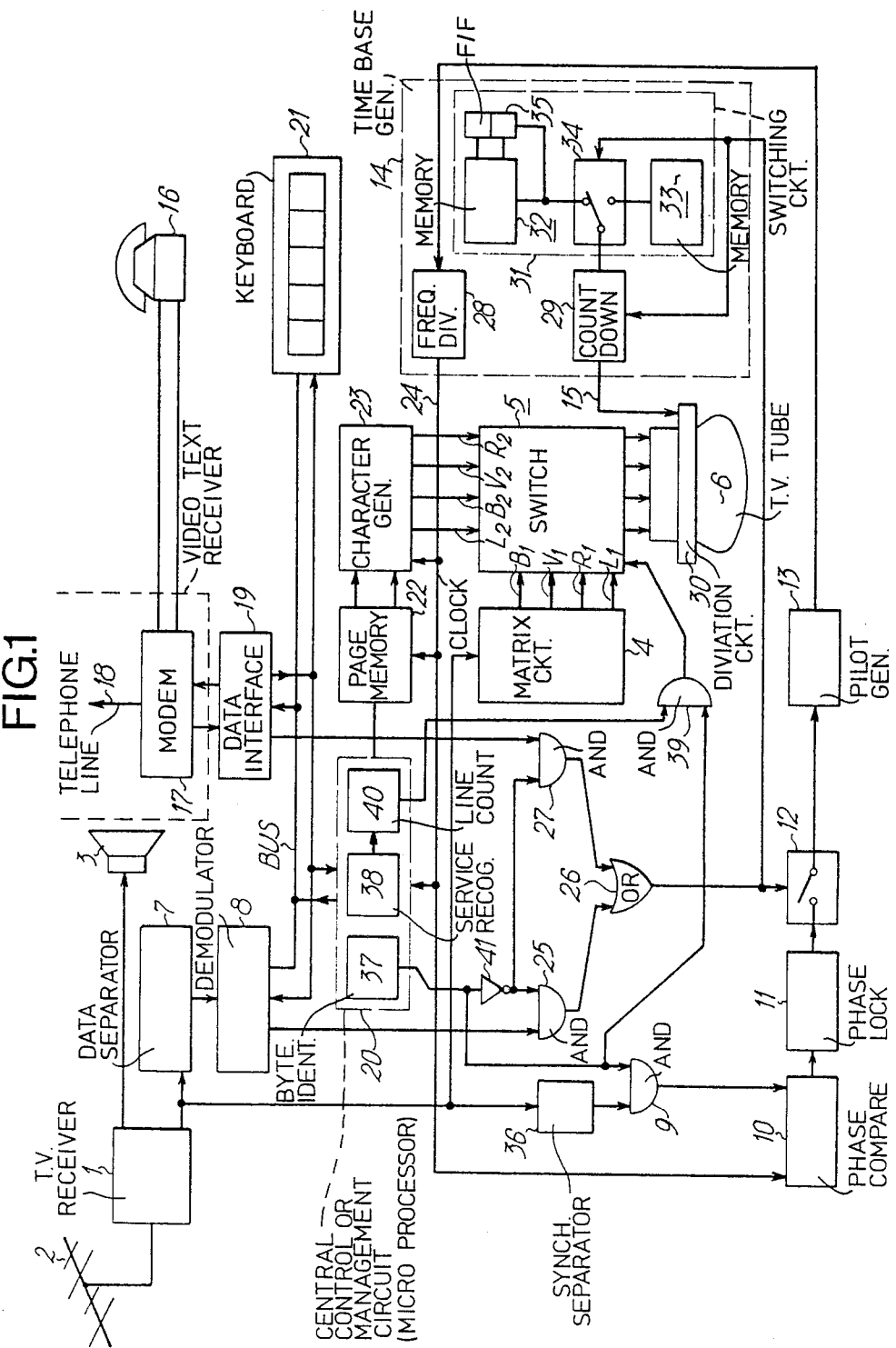

United States Patent [19]

Marti

[11] Patent Number: 4,486,779
[45] Date of Patent: Dec. 4, 1984

[54] APPARATUS TO DISPLAY GRAPHIC MESSAGES TRANSMITTED BY VIDEOTEXT SYSTEMS

[75] Inventor: Bernard Marti, Noyal-sur-Vilaine, France

[73] Assignees: L'Etat Francais, represente par le Ministre des P.T.T. (Centre National d'Etudes des Telecommunications); Etablissement Public de Diffusion dit "Telediffusion de France", both of France

[21] Appl. No.: 394,542

[22] Filed: Jul. 2, 1982

[51] Int. Cl.³ .......................... H04N 7/08; G06F 3/14
[52] U.S. Cl. .................................. 358/147; 340/721
[58] Field of Search ............... 358/147, 142, 146, 152, 358/183; 340/706, 721, 747, 479

[56] References Cited

U.S. PATENT DOCUMENTS 4,303,941 12/1981 Marti .................................. 358/147
4,393,404 7/1983 Cox .................................... 358/147

FOREIGN PATENT DOCUMENTS 2949020 12/1980 Fed. Rep. of Germany .
WO79/00745 10/1979 PCT Int'l Appl. .
1556366 11/1979 United Kingdom .

OTHER PUBLICATIONS

Designing for Consumer Electronics–Teletext and Viewdata, by Looks, Electronic Engineering, Jan. 1980, pp. 61–77.
Simplify Video–Display Design by Using a Versatile IC Controller, by Hayden Publishing Co., Electronic Design, vol. 27, No. 13, 6/79, pp. 94–102.
Le System Antiope, Toute L'Electronique, No. 439, Jan. 1979, Paris, Fr., pp. IV–IX.
Variable Spaced Alphanumeric Display, by J. E. R. Young, IBM Technical Disclosure Bulletin, vol. 21, No. 1, Jun. 1978, pp. 379–380.
Digital TV Graphics, by Herbert C. Hendrickson, Institute of Electrical and Electronics Engineers, Nerem Record: Boston, Nov. 6–8, 1973, vol. 15, No. 4, pp. 39–46.
Enhanced UK Teletext Moves Towards Still Pictures, by John Chambers, IEEE Transactions on Consumer Electronics, vol. CE-26, 8/1980, pp. 527–554.
The Application of Picture Coding Techniques to Viewdata, by K. Clarke, IEEE Transaction on Consumer Electronics, vol. CE-26, Aug. 1980, pp. 568–577.
An Integrated Teletext and Viewdata Receiver, by Insam, et al., The Sert Journal, vol. 11, Oct. 1977, pp. 210–213.

*Primary Examiner*—Tommy P. Chin
*Attorney, Agent, or Firm*—Laff, Whitesel, Conte & Saret

[57] ABSTRACT

A TV receiver is adapted to display either the regularly broadcast video signals or videotext information. The video signals contain their own internal synchronization signals. The videotext information requires locally generated synchronization signals which may be used to replace the normal video internal synchronization signals. The invention provides means for switching between the normally broadcast and the internally generated synchronization signals.

3 Claims, 1 Drawing Figure

APPARATUS TO DISPLAY GRAPHIC MESSAGES TRANSMITTED BY VIDEOTEXT SYSTEMS

The present invention concerns an apparatus for displaying, on a television receiver screen, graphic messages transmitted by videotext systems. The system has a data separator, a data demodulator, a page memory, a character generator, a normal video-graphic video switch, a management or central control circuit, a service definition keyboard connected to the management circuit, internal synchronization signal generation means, a circuit to separate the external synchronization of the broadcasting network, and control means for the interlaced and non-interlaced line scanning.

A videotext system is a system that transmits digital data and displays text on a television screen. More specifically, the invention concerns an improvement to the ANTIOPE teletext system which has been described in the patents granted on U.S. Pat. No. 4,361,848, filed May 17, 1979, U.S. Pat. Nos. 4,213,124 and 4,290,062. However, the usage of the apparatus in accordance with the invention is not limited to the particular videotext system described in these patents, but can be applied to all videotext systems, such as that known under the name CEEFAX. More generally, the invention is applicable to all interactive or broadcasted videotexts.

The display of texts on a television receiver screen, in which a two-frame interlaced sweep is used, results in a flickering which causes considerable visual fatigue.

One aim of the invention is to suppress, in most cases, the flickering of texts displayed on a television screen.

Broadcast videotext receivers comprise receiver circuits which deliver the external synchronization signals and the received video. A videotext decoder uses the external synchronization of the received video signal. A character generator is controlled by the decoder to yield a synthetic video signal to the display tube of a television receiver. To date, the display tube was operated with the external synchronization signals in exactly the same way that it is operated to obtain a conventional picture. This results in an interlaced frame picture and thus a flickering. However, it is possible to operate a television tube with a noninterlaced frame synchronization, which results in a considerably reduced flickering.

As described in U.S. Pat. No. 4,096,524, an internal synchronization may be used instead of an external synchronization when the latter is not normally received. However, in the U.S. Pat. No. 4,096,524, internal synchronization is used only to mitigate the absence of external synchronization. In particular, it is used to re-establish an interlaced frame sweeping.

In French Pat. No. 2,404,359, we have also described a videotext receiver in which separated synchronization signals and locally generated synchronization signals are available. A selectable one or the other of these two form of synchronization signals is used. This selection is not uniquely controlled by the fact that the separated synchronization signal may not be available, resulting from the absence of or a failure to adapt to the received broadcasted signal. In this French patent, the separated synchronization signals are used to visualize a picture on the television screen when the user decides to look at a normal television picture. An apparatus may use locally generated synchronization signals for visualization on the television screen when the user chooses to look at information messages. Another apparatus guarantees the phase hookup of the locally generated synchronization signals with respect to the separate synchronization signals when an adequate video signal is received.

The French Pat. No. 2,447,122, avoids flickering and hopping in the pictures which is produced by character generators, such as those of videotext systems. The means utilized to achieve this result, comprise a frame interpolating circuit, which implies the use of a considerable amount of memory and thus a substantial expense.

In West German Pat. No. 2,949,020, flickering is avoided by modifying the vertical deviation such that the lines of even and odd frames overlap.

One object of the present invention, with regard to the earlier apparatus mentioned above, allows the selection of a local synchronization each time it is advantageous and possible to do so.

Another object of the invention is to provide an apparatus which, each time a local synchronization is selected, allows the removal of flickering by using a small number of simple means, and in particular, means which are simpler than those which were mentioned above.

The characteristics of the above mentioned invention as well as other, will appear more clearly upon reading the following description in relation to the one attached FIG. 1 which shows the inventive videotext system.

The apparatus of FIG. 1 comprises a television receiver circuit 1 connected to an antenna 2 and which delivers sound to a speaker 3 and video and chrominance information to a matrixing circuit 4. The luminance signal L1 and the chrominance signals B1, V1 and R1 are delivered through a switch 5 to a screen tube 6. The video output of receiver circuit 1 is also connected to the input of a data separator 7 which feeds a demodulator 8 similar to that which is described in the French Pat. No. 2,313,825.

The output of circuit 1 is also connected to a synchronization separation circuit 36 whose output is connected to the first input of an AND gate 9 whose output is connected to the first input of a phase comparator 10. The output of the phase comparator 10 is connected to the input of a phase locking circuit 11 whose output is connected by an electronic switch 12 to the input of a pilot generator 13. The output of the pilot generator 13 is connected to the input of a time base 14 which locally generates the synchronization signals which are conventionally applied to the tube 6, via link 15. The apparatus of FIG. 1 comprises also a subscriber telephone gear associated with a modem 17, which is, on one hand, connected to a telephone line 18 and, on the other hand, to a data interface 19.

The apparatus is also completed by a central control or management circuit 20 which is connected by a data exchange bus BUS to a demodulator 8, to interface 19, to an operator keyboard 21 and to a page memory 22. The data output of memory 22 is connected to the input of a character generator 23 whose output transmits the luminance L2 and the chrominance signals B2, V2 and R2 to the second input of switch 5 which according to its state, transmits them to the screen tube 6.

An output link 24 from time base 14 is connected to the clock inputs of circuits 20, 22 and 23 as well as the second input of the phase comparator 10.

The central control or management circuit 20 has a first control output connected, on one hand, to the second input of AND gate 9 and, on the other hand, through an inverter 41, to the first input of an AND gate 25 whose output is connected to the first input of an OR gate 26. A second control output of inverter 41 is connected to the first input of an AND gate 27 whose output is connected to the second input of OR gate 26.

The output of OR gate 26 is connected to the control input of electronic switch 12. When OR gate 26 does not produce a signal, switch 12 connects the input of generator 13 to the output of the phase locking circuit 11. When OR gate 26 produces a signal, switch 12 opens the link between the generator 13 and the circuit 11.

The phase locking circuit 11 yields a continuous signal which is related to the output signal of the phase comparator 10, the continuous signal acting on the frequency of the pilot generator to reduce the phase difference between the input signals to comparator 10. It is apparent that, when contact 12 is open, generator 13 operates at its own proper frequency, which can be 12 MHz. In practice, generator 13 is quartz stabilized.

The time base circuit 14 comprises a set of frequency dividers 28 which deliver, by 24, the clocking signals necessary to the management circuit 20, to the page memory 22 and to the character generator 23, a set of frequency dividers 29 which divide, by 15, to the tube 6 deviation circuit 30 the frame and line synchronization signals, and a switching circuit 31. In practice, the dividers of set 29 operate as down counters from an initial value which is applied to their control input, which is itself connected to the output of switching circuit 31. In switching circuit 31 are two memory registers 32 and 33 whose read outputs are respectively connected to the fixed terminals of a switch 34 whose movable contact is the output of circuit 31. The control input of circuit 31, that is to say of switch 34, is connected to the output of OR gate 26.

Register 32, is furthermore, associated with a flip-flop 35 which changes state each time that register 32 is read. In its first state, flip-flop 35 reduces the contents of register 32 by 1 and, in its other state, adds 1 to the contents. If the contents of the register associated with counter 29 is set at n, the contents of 32 is chosen to be initially at (n−312), which causes counter 29 to alternately count 312 and 313. The reading of memory 32 is carried out at each zero crossing of counter 29. As a result, we obtain the interlaced scanning or sweeping corresponding to the 625 line norm.

The contents of memory register 33 is fixed and chosen to be 312. As a result, the signals applied to circuit 30 from counter 29, in this case, correspond to a non-interlaced scanning or sweeping, which is emphasized by a sequence of identical 312 line frames. The memories 32 and 33 have the same contents to within a binary digit. These memories can advantageously be replaced by a resistance memory, for example, delivering the code 10011100X, the value of X as determined by switch 34, being either zero, or the content of flip-flop 35 which changes state at each zero crossing of counter 29.

Similar to switch 12, when OR gate 26 delivers no signal, contact 34 connects memory 32 to the output of switching circuit 31 and, in the opposite case, it is register 33 which is connected to the output of circuit 31.

The central control or management element 20 is, by preference, implemented in the form of a micro-processor which is capable in terms of the commands delivered by keyboard 21, which is at the disposition of the operator. Circuit 20 selects the data transmitted on the BUS, either by demodulator 8, or by interface 19. The microprocessor of management circuit 20 has means to receive and analyze each byte of row 0 of each page of broadcast or interactions videotext. In particular, it has a synchronization byte identification circuit 37 and a subtitle service recognition circuit 38. When the contents of the synchronization type identification byte indicates that the display is to be done with external synchronization, circuit 37 activates its output towards AND gate 9 and towards the first input of an OR gate 39. In the opposite situation, the output of identification circuit 37 is not activated which opens gates 25 and 27, responsive to inverter 41. When the subtitle byte is recognized, the output of circuit 38, which is connected to a line counter 40, is activated. The purpose of counter 40 is to determine the lines of the frame in which the subtitle is to be inserted. Normally, the output of circuit 40, which is connected to the second input of gate 39, is set to open gate 40. The output of gate 39 is connected to the control input of switch 5. When the output of OR gate 39 is activated, switch 5 transmits the signals coming from circuit 4. In the opposite case, it transmits the signals coming from the character generator 23. During the insertion lines, the output of counter 40 is not activated, which resets gate 39.

The second inputs of AND gates 25 and 27 are respectively connected to the outputs of circuits 8 and 19, which are activated when these circuits are in use.

When the service requested is a normal television program, the management circuit 20 activates its output to gate 9, but lets the outputs to 25 and 27 become inactive. Thus, OR gate 26 delivers no signal and comparator 10 assigns generator 13 to the broadcast network synchronization. The time base circuit 14 controls an interlaced sweep on the tube 6. In other respects, gate 39 is open and normal video is applied to tube 6.

When the requested service is a broadcasted videotext, such as the ANTIOPE service, the management circuit 20 detects, in a circuit which receives the first row bytes of each page 37, that the synchronization type byte designates internal synchronization, which opens gate 25. Thus, OR gate 26 opens switch 12 and changes the state of switch 34. The time base circuit 14 operates on internal synchronization and controls an interlaced sweeping.

When the service requested is an interactive videotext, such as the TELETEL service, circuit 20 detects once again, in circuit 37, that the synchronization type byte designates once again internal synchronization, which opens gate 27. We have the case of broadcasted videotext.

In another variation, the selection of modem 17 and its interface 19 as data input device could directly induce the opening of switch 12. In this case, gate 27 could be removed, the second input of gate 26 being directly connected to the appropriate output of interface 19.

When the broadcasted service is an insertion in a normal television picture, the management circuit 20 detects that the synchronization type byte designates external synchronization, which opens gate 9. Thus, the time base operates on a phase locked synchronization and controls an interlaced sweeping. Furthermore, circuit 38 recognizes the subtitle byte which activates counter 40 and guarantees, by AND gate 39, the switching of switching circuit 5 to select between matrix circuit 4 and character generator 23.

In practice, the management circuit 20 is in the form of a microprocessor, circuit 37 is implemented by a simple memory cell.

Those who are skilled in the art will readily perceive how to modify the invention. Therefore, the appended claims are to be construed to cover all equivalent structures which fall within the true scope and spirit of the invention.

I claim:

1. An apparatus for displaying videotext information on a television receiver screen, said apparatus comprising:

internal synchronization means, phase locking means coupled to be driven by received video signals from a television receiver, first switching means for selectively connecting the phase locking means to the internal synchronization means, means including a first and a second means for respectively controlling interlaced and non-interlaced scanning of displays by said television receiver screen, second switching means for selectively switching between the respective interlaced and non-interlaced scanning control means, data demodulator means including a means for giving a working status indication, central management control circuit means including a first byte type recognition circuit means for recognizing a type of synchronization in the bytes of a first row of each page of videotext information, and first logic means coupled between said first byte type recognition circuit means and said first and second switching means and being responsive to the working status indication of the data demodulator means for selectively operating the first and second switching means responsive to said first byte type recognition circuit means and to said demodulator means to select between external synchronization contained within said received video signals and said internal synchronization means.

2. The apparatus of claim 1, comprising an interactive videotext receiver circuit means interposed between a telephone line and said television receiver, said videotext receiver means including in series a modem means and a data interface means coupled to said management control circuit means, and second logic means coupled between said first byte type recognition circuit means and said data interface means for selectively operating the first and second switching means responsive to said first byte type recognition circuit means and the interface means, to cause the first and second switching means to select between said external and internal synchronizations.

3. The apparatus of claim 1 or 2 wherein the management control circuit means also comprises a second recognition circuit means for identifying subtitle bytes among the bytes of the first row of each page of videotext information, video-graphic switching means for selectively applying either video signals received by said television receiver or said videotext information to be displayed on said television screen, and third logic means coupled to be driven by said first and second logic means for controlling the switching of said video-graphic video switch means during an insertion of videotext information lines into said video signals television received by said receiver.

* * * * *